United States Patent
Bobowski

(10) Patent No.: US 9,392,114 B1
(45) Date of Patent: Jul. 12, 2016

(54) SYSTEMS AND METHOD FOR CALL CENTER AGENT PERFORMANCE IMPROVEMENT DRIVEN BY CALL REASON NORMS

(71) Applicant: Sprint Communications Company L.P., Overland Park, KS (US)

(72) Inventor: James J. Bobowski, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/007,207

(22) Filed: Jan. 27, 2016

(51) Int. Cl.
*H04M 3/00* (2006.01)
*H04M 5/00* (2006.01)
*H04M 3/51* (2006.01)

(52) U.S. Cl.
CPC ...... *H04M 3/5175* (2013.01); *H04M 2203/401* (2013.01); *H04M 2203/402* (2013.01)

(58) Field of Classification Search
CPC . H04M 3/5175; H04M 3/42221; H04M 3/51; H04M 3/2218; H04M 3/2227
USPC .............. 379/265.06, 266.1, 265.03, 266.01, 379/266.02, 265.05, 265.07
See application file for complete search history.

(56) References Cited

U.S. PATENT DOCUMENTS 9,112,974 B1 * 8/2015 Wilsie ................. H04M 3/5175
9,160,854 B1 * 10/2015 Daddi ................. H04M 3/5175

* cited by examiner

*Primary Examiner* — Thjuan K Addy

(57) ABSTRACT

A computer system for evaluating and coaching call center employee performance, comprising at least one processor, a non-transitory memory, and an application stored in the memory. When executed, the application: collects call reports about calls to telephone systems at different call centers; collects information about the calls from a call center computer system, where the information identifies call notes entered by agents, computer screens viewed by agents while handling a call, and a call reason determined by the call center computer system; determines a call handling performance for each call reason handled by an agent, for each agent; determines call handling performance statistics for each call reason, based on the call handling performances of all the agents; and provides a user interface to compare call handling performance by call reason among agents' supervisors, based on the call handling performance of each supervisor's agents relative to the call handling performance statistics.

20 Claims, 3 Drawing Sheets

SYSTEMS AND METHOD FOR CALL CENTER AGENT PERFORMANCE IMPROVEMENT DRIVEN BY CALL REASON NORMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Call centers receive and transmit large volumes of requests by telephone. A call center may be operated by a company to administer incoming product support information inquiries from consumers. Call centers may be operated using customer service representatives (CSRs) or call center agents with workstations that include a computer for each CSR, a telephone handset or headset connected to a telecom switch, and one or more supervisor stations. A call center may be independently operated or networked with additional call centers. Multiple call centers may be linked to a corporate voice and data network that may include mainframe computers, servers, databases, and a plurality of client devices. Many large organizations use call centers to interact with their customers. Examples include financial service providers, airlines, utility companies, and customer support for computer hardware and software. Some businesses may support internal functions through call centers. Examples of this include help desks to assist employees with network issues and administration of employee assistance programs.

SUMMARY

In an embodiment, a computer system for evaluating and coaching call center employee performance is disclosed. The computer system comprises at least one processor, a non-transitory memory, and an application stored in the non-transitory memory. When executed by the processor, the application: (1) collects call reports about calls to a plurality of different telephone systems at a plurality of enterprise customer care centers, where each report identifies one of the enterprise customer care centers, a start time of the call, a stop time of the call, and at least one customer care representative that handled the call and (2) collects call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call. The application further (3) marshals the call reports and the call information according to customer care representatives and according to call reasons and (4) determines a call handling performance for each call reason handled by a customer care representative, for each customer care representative, based on the marshaled call reports and call information. The application further (5) determines call handling performance statistics for each call reason, based on the call handling performances of all the customer care representatives and (6) provides a user interface to compare call handling performance by call reason among a plurality of supervisors of customer service representatives, based on the call handling performance of customer service representatives reporting to each supervisor relative to the call handling performance statistics.

In an embodiment, a method of evaluating call center employee performance is disclosed. The method comprises: (1) collecting by a computer system call reports about calls to a plurality of different telephone systems at a plurality of enterprise customer care centers, where each report identifies one of the enterprise customer care centers, a start time of the call, a stop time of the call, and at least one customer care representative that handled the call and (2) collecting by the computer system call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call. The method further comprises (3) marshaling by the computer system the call reports and the call information according to customer care representatives and according to call reasons and (4) determining by the computer system a call handling performance for each call reason handled by a customer care representative, for each customer care representative, based on the marshaled call reports and call information. The method further comprises (5) determining by the computer system call handling performance statistics for each call reason, based on the call handling performances of all the customer care representatives and (6) presenting by the computer system a user interface that compares call handling performance by call reason among a plurality of supervisors of customer service representatives, based on the call handling performance of customer service representatives reporting to each supervisor relative to the call handling performance statistics.

In an embodiment, a computer system for evaluating and coaching call center employee performance is disclosed. The computer system comprises at least one processor, a non-transitory memory, and an application stored in the non-transitory memory. When executed by the processor, the application: (1) collects call reports about calls to a plurality of different telephone systems at a plurality of enterprise customer care centers, where each report identifies one of the enterprise customer care centers, a start time of the call, a stop time of the call, and at least one customer care representative that handled the call and (2) collects call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call. The application further (3) marshals the call reports and the call information according to customer care representatives and according to call reasons and (4) determines a call handling performance for each call reason handled by a customer care representative, for each customer care representative, based on the marshaled call reports and call information. The application further (5) determines call handling performance statistics for each call reason, based on the call handling performances of all the customer care representatives; (6) identifies when the performance of a first customer care representative in handling a first call type is falling below a predefined threshold of performance, where the predefined threshold is defined in terms of a number of standard deviations from a median performance value for the first call type; and (7) takes action based on the identified performance falling below the threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
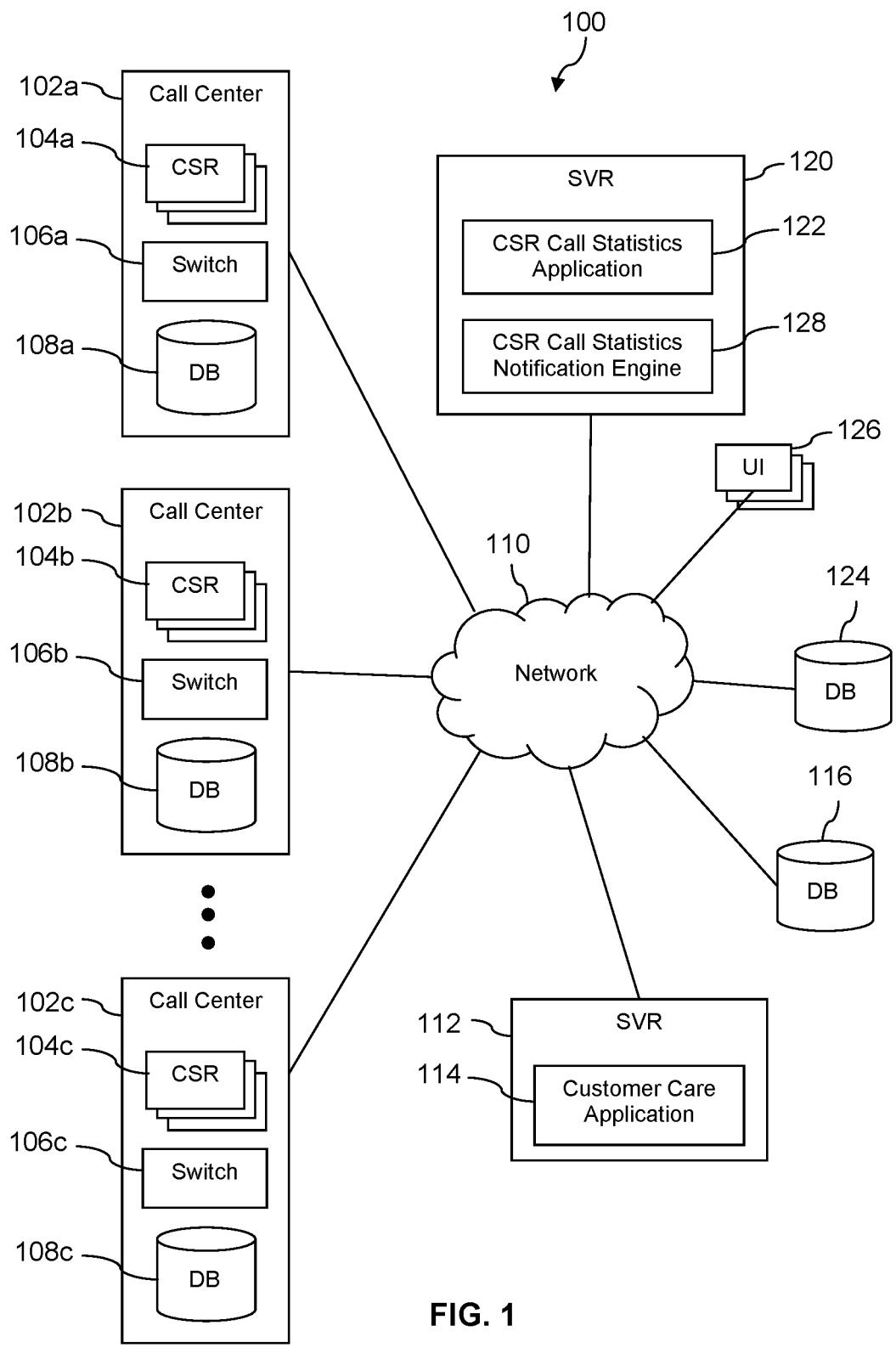
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Opportunities for improving customer care performance by customer service representatives (CSRs) or care agents can be found in collecting and analyzing available customer care performance data by computer systems. The high turnover of CSRs that is common in all customer facing organizations presents challenges to traditional supervision and management of employees, as supervisors may not have enough time to get to know their employees and evaluate their strengths and weaknesses and identify training to improve their performance. For example, in the traditional supervision practice, it can take multiple days for call center supervisors to compile data, including call notes, every week for a plurality of calls for a plurality of specific call reasons for a plurality of CSRs. Essentially, this task becomes intractable because the supervisor cannot spend all of their time on this task alone. The present disclosure teaches systems and a method for improving CSR performance by compiling data from a plurality of call centers and from another database, storing the compiled data in a new database, analyzing the compiled data in the new database according to call reason to determine CSR performance statistics (e.g., median performance metrics and standard deviations of those performance metrics per call reason), and providing a user interface that promotes call center supervisors quickly reviewing the performance of each individual CSR compared to a median performance of a plurality of CSRs, for the same call reason, across the plurality of call centers.

Further, the present disclosure teaches an application that: (1) collects data about customer care calls from switches in call centers; (2) collects data about call handling behavior from a customer care computer tool; (3) analyzes the collected data to determine performance metrics for a plurality of CSRs for each call reason; (4) determines a median and standard deviations for the performance metrics; and (5) provides a user interface to see how selected CSRs perform in relation to medians in terms of standard deviations on either side of the median. The data is collected for each call reason, and a performance metric is determined for each call reason, as well.

Call reasons may be considered to associate to customer care skills or procedures. Knowing how to handle a customer call well that associated with a first call reason does not mean the CSR is able to handle a customer call well when it is associated with a different call reason. To improve the CSR performance, it is thought desirable to evaluate CSR performance independently on different call reasons. Further, the question then arises what is good performance relative to a given call reason? It may be that for a first call reason, the median performance is high across a plurality of call centers while for a second call reason the median performance is low, possibly because of a greater difficulty or complexity associated with the second call reason. Analyzing statistical distribution of performance across call centers for each call reason provides a basis for evaluating the performance of CSRs for a specific call reason against the distribution of performance of his or her peers when handling the same call reason. These analyses can be performed automatically by a computer system. These results can be a powerful tool for supervisors in evaluating their teams of CSRs and to identify who needs training and on what specific topics or procedures. Further, the same analytic results can be rolled up and used to compare among supervisors, to identify opportunities for supervisors to raise their game in preparing their CSRs to handle specific call types. Because time for training CSRs and for supervisors to interact with CSRs may be limited, the ability to quickly and reliably identify the call reasons most in need of training can improve call center performance.

Because call center supervisors cannot practically compile the amount of data that may be available to accurately and effectively analyze the performance of CSRs and coach CSRs, this activity is better performed by a computer system with one or more applications that perform those tasks in a more timely and insight generating manner. Thus, improving the performance of CSRs, along the lines described in summary above, is inherently a computer based solution and engenders new computer challenges. The system described provides improvements of computing solutions to promote achieving the improved performance of CSRs.

Turning now to FIG. 1, a system 100 is described. In an embodiment, the system 100 may comprise a plurality of call centers 102a, 102b, 102c in one, several, or many countries. Each call center in the plurality of call centers 102a, 102b, 102c may comprise a plurality of CSRs 104a, 104b, 104c, a switch 106a, 106b, 106c, and a database 108a, 108b, 108c.

In an embodiment, the system 100 may also comprise a network 110, a server 112, a customer care application 114, a database 116, a server 120, a CSR call statistics application 122, a database 124, a user interface 126, and a CSR call statistics notification engine 128.

The server 120 is a computer system. Computer systems are described in detail hereinafter. The CSR call statistics application 122 executes on the server 120 and may collect a plurality of call reports about calls to a plurality of different telephone systems at a plurality of call centers 102a, 102b, 102c. The CSR call statistics application 122 may compile data from multiple different databases connected to the network 110 and store the data in database 124. In some embodiments, the CSR call statistics application 122 may pull data from the databases 108a, 108b, 108c and may pull other data from database 116. The databases 108a, 108b, 108c may receive customer care call data (e.g., information about calls from customers to the call center) from the switches 106a, 106b, 106c. The data that the databases 108a, 108b, 108c may receive from the switches 106a, 106b, 106c may include an identity of one of the plurality of call centers 102a, 102b, 102c, a call start time, a call end time, an identity of at least one CSR from the plurality of CSRs 104a, 104b, 104c that handled the call, and any other data that the switches 106a, 106b, 106c may collect.

The database 116 may receive data about customer care calls (e.g., historical information or log information about customer care calls) from customer care application 114, which executes on server 112. Customer care application 114 may be used by CSRs to handle customer care calls. For example, the CSRs may have a user interface to the customer care application 114 on their computer screens (e.g., a web interface to the customer care application 114) that provides a plurality of controls for accessing functions provided by the customer care application 114. The user interface may provide a widget or window for accessing and searching a knowledge base to help the CSR determine a correct course of action to take to solve a customer's issue. The user interface may provide access to procedure checklists that may step the CSR through common protocols for addressing customer care calls.

The data that the database 116 may receive from customer care application 114 may include a call reason for each call received by each CSR from the plurality of CSRs 104a, 104b, 104c across the plurality of call centers 102a, 102b, 102c, notes entered by the plurality of CSRs 104a, 104b, 104c about each call, and computer screens viewed by the plurality of CSRs 104a, 104b, 104c while handling each call. The CSR call statistics application 122 may then combine the data from the databases 108a, 108b, 108c and database 116 to create and identify performance metrics for each call reason for each CSR from the plurality of CSRs 104a, 104b, 104c across the plurality of call centers 102a, 102b, 102c. The combined data may then be stored in database 124.

Performance management in a call center environment involves choosing and capturing performance metrics, observing behavior that may affect metrics, coaching behaviors to improve performance, and driving accountability for performance. In a call center, a plurality of metrics may be captured and analyzed. An organization's call center or plurality of call centers 102a, 102b, 102c may handle incoming telephone calls from customers, distributors of the organization's products, and the organization's employees in the field. The telephone calls may request technical support, installation support, product information, or assistance with presale or post-sale questions or problems. A call center may employ tens, hundreds, or thousands of CSRs. Calls may be routed to queues that are staffed by a plurality of CSRs 104a, 104b, 104c that may be trained in technical, sales, and/or service areas associated with the queues. Metrics, or measurements of activity, may be employed to measure various aspects of the call handling performance of the plurality of CSRs. In an embodiment, the plurality of CSRs 104a, 104b, 104c in a call center environment may place outgoing calls, and this activity may be monitored and measured.

The CSR call statistics application 122 may determine average handling time (AHT) metrics that measures the average total amount of time consumed by an individual CSR to handle a customer call. The average handling time metric is calculated per call reason based on handling times recorded for handling calls associated with the given call reason by the CSR (thus a plurality of AHT metrics may be calculated for each CSR, one AHT for each different call reason handled by the CSR or one AHT for the five most common call reasons handled by the CSR, or the ten most common call reasons handled by the CSR, or the twenty most common call reasons handled by the CSR, or for the call reasons for which the CSR handled a minimum number of customer care calls during the analysis period). This metric may comprise both the time spent on a live call with a customer and after call work, the time a CSR may spend after the live call ends, which may comprise documenting the call in a problem record and taking other actions, such as arranging a service visit to the customer, arranging for a part to be sent to the customer, or recording notes regarding the live call.

The CSR call statistics application 122 or the customer care application 114 may also determine customer satisfaction (CSAT) metrics measured in surveys taken immediately after the end of a call before the caller disconnects or subsequently in an outgoing call to the customer, in an electronic mail inquiry to the customer, or in another manner. A survey may ask the customer a series of questions that elicit quantifiable responses. The responses may be tabulated, and a survey score may be determined. Alternatively, a survey may present a binary choice to the customer of "satisfied" or "unsatisfied." The CSR call statistics application 122 may gather a plurality of surveys associated with an individual CSR's call activity and perform statistical analysis on the plurality of surveys to calculate composite CSAT metrics for an individual CSR from the plurality of CSRs 104a, 104b, 104c. The CSAT metrics are calculated on a per call reasons basis, thus for each CSR, a plurality of CSAT metrics may be calculated, one CSAT metric for each of a plurality of different call reasons.

The CSR call statistics application 122 may also determine call transfer rate (TR) metrics that measures the number of times, per call reason, that a CSR from the plurality of CSRs 104a, 104b, 104c transfers a call to another CSR from the plurality of CSRs 104a, 104b, 104c. The transfer rate may measure the transfers that are undesired by call center supervisors. Undesired transfers may include transferring a call because of an inability to answer a customer's question, an inability to solve a customer's issue, a lack of knowledge regarding a customer's inquiry, not wanting to interact further with a customer, or any other reason in accordance with the disclosure. Desired transfers, though, are not included in the TR metric. Desired transfers may include transferring a call to another CSR from the plurality of CSRs 104a, 104b, 104c who is an expert in the particular area of a customer's issue or any other reason in accordance with the disclosure.

The CSR call statistics application 122 may also determine next call prevention (NCP48) metrics that measures, for each difference call reason, the number of times the same customer calls back within 48 hours of making an initial call regarding the same issue that prompted the initial call. Handling second and subsequent customer calls on a single issue may be expensive for the telecommunications service provider and damaging to customer satisfaction. A productive CSR from the plurality of CSRs 104a, 104b, 104c may resolve a customer's issue on the first call and avert customer callbacks on the same issue. A CSR from the plurality of CSRs 104a, 104b, 104c performing well may be associated with a high NCP48 metric. The NCP48 metric may be measured and expressed as a percentage of customer issues resolved during a first call relative to the total number of calls for newly reported problems handled in a predetermined time period. This predetermined time period may be 24 hours, 36 hours, 48 hours, or any other desired time period in accordance with the disclosure. In an embodiment, the predetermined time period is 48 hours.

In an embodiment, the CSR call statistics application 122 may compile data from the databases 108a, 108b, 108c, 116 for each CSR from the plurality of CSRs 104a, 104b, 104c and may store the data in database 124. The CSR call statistics application 122 may also compile data from the databases 108a, 108b, 108c, 116 for each call reason and may store the data in database 124. In an embodiment, there may be more than 300 different call reasons. The CSR call statistics application 122 may also compile data from the databases 108a, 108b, 108c, 116 for each performance metric and may store the data in database 124. The CSR call statistics application 122 may include the previously mentioned performance metrics, i.e. AHT, CSAT, TR, and NCP48. The CSR call statistics application 122 may take all of the data for each performance metric for each call reason for each CSR from the plurality of CSRs 104a, 104b, 104c from the plurality of call centers 102a, 102b, 102c to create a median and standard deviation for each performance metric for each different call reason for the plurality of CSRs 104a, 104b, 104c. The CSR call statistics application 122 may then compare each individual CSR's performance against the median and standard deviation for each performance metric for each call reason to evaluate the performance of each individual CSR. In an embodiment, the CSR call statistics application 122 compiles data once every week. However, the data compiling process may also be performed daily, once every two or three days, bi-weekly, monthly, or any other time period in accordance with the disclosure. The process of the CSR call statistics application 122 compiling the data from the databases 108a, 108b, 108c, 116 is inherently a computer solution, and the process disclosed is an improvement of computer technology.

In an embodiment, a supervisor may utilize a user interface 126 to determine the performance of an individual CSR. The first step a supervisor may take when utilizing the user interface 126 is to choose his or her own call center from a list of the plurality of call centers 102a, 102b, 102c. Once the supervisor selects his or her call center, a list of all of the supervisors for that particular call center may be automatically populated and presented. The supervisor may then choose himself or herself from the list of all supervisors for his or her call center. The supervisor may then select a call reason that he or she wants to evaluate. Once a call reason is selected, a grid may appear that indicates the performance of each CSR supervised by the subject supervisor with respect to each performance metric. Each CSR's performance may be indicated by a percentage and/or a color. With respect to the color, green signifies a good performance, a performance that may be at least two standard deviations above the median, yellow signifies an average performance, a performance that may be within two standard deviations of the median, and red signifies a bad performance, a performance that may be at least two standard deviations below the median. The color scheme may also include intermediate, lighter or darker, shades of green and yellow to indicate each CSR's proximity to the median. The supervisor may use the grid to determine which CSRs might need additional coaching with respect to a particular call reason.

The supervisor may then drill down even further into the data by selecting an individual CSR from the plurality of CSRs 104a, 104b, 104c in the selected call center. When the supervisor selects an individual CSR, a graph of the data indicating a trend of the individual CSR's performance over a certain time period may be displayed. In an embodiment, the displayed time period is the previous four weeks. However, the time period displayed may be the previous two weeks, three weeks, eight weeks, or any other time period in accordance with the disclosure. There may be an indicator, a range on the graph, regarding a preferred zone of performance over the displayed time period, and the CSR's performance may be charted for each call reason for the displayed time period. The supervisor may use the trend to determine if the individual CSR is simply having a bad day/week, depending on the displayed time period, or if the CSR's performance in a particular call reason has been declining or increasing steadily for the displayed time period. A CSR may just be having a bad day/week if his or her performance for a particular day/week is below average, but his or her performance for the other days/weeks during the displayed time period is either average or above-average. If it seems like a CSR may just be having a bad day/week, his or her supervisor may disregard the below-average performance for that day/week and reevaluate the CSR's performance in the following days/weeks to see if the CSR's performance returns to either average or above-average.

Finally, in an embodiment, the supervisor may dive even deeper into the data by looking up notes from selected individual calls that a CSR from the plurality of CSRs 104a, 104b, 104c handled during the displayed time period for at least one call reason. The notes may be prepared and logged by each CSR after each call he or she handles. The notes for each call may identify actions taken by each CSR while handling each specific call. If a supervisor wants to look up a CSR's performance regarding NCP48, the notes from a CSR who handled any potential second calls are also included. This allows the supervisor to show the CSR that handled the initial call what he or she did not do correctly in a clear, efficient manner by allowing the CSR that handled the initial call to see how the CSR that handled the second call resolved the customer's issue.

In a further embodiment, the CSR call statistics application 122 may perform certain automated actions. The automated actions may be performed with the help of a CSR call statistics notification engine 128. One automated action may be constantly monitoring the performance of the plurality of CSRs 104a, 104b, 104c and sending a notification to a specific CSR, that CSR's supervisor, that supervisor's manager, or any combination thereof that a specific CSR's performance has fallen outside of the acceptable performance area for any performance metric for one or more call reasons. The CSR call statistics application 122 may monitor the desired performance metrics with respect to each CSR from the plurality of CSRs 104a, 104b, 104c for every call reason across the plurality of call centers 102a, 102b, 102c. The CSR call statistics notification engine 128 may send a notification by electronic mail or any other appropriate means. Sending automatic notifications may allow a CSR to correct his or her performance immediately without having to wait for a meeting with his or her supervisor every week, every other week, or at any other desired time period. This may lead to more efficient call center operation and a better performance from the plurality of CSRs 104a, 104b, 104c across the plurality of call centers 102a, 102b, 102c.

Another automated action that the CSR call statistics application 122 may perform is tracking the effectiveness of supervisors at the plurality of call centers 102a, 102b, 102c regarding coaching any poorly performing CSRs. The CSR call statistics application 122 may monitor the performance metrics with respect to each CSR from the plurality of CSRs 104a, 104b, 104c across the plurality of call centers 102a, 102b, 102c for every call reason and determine how long it takes for a specific CSR to increase his or her below-average performance, a performance that may be at least two standard deviations below the median, to either an average performance, a performance that may be within two standard deviations of the median, or an above-average performance, a performance that may be at least two standard deviations above the median. The amount of time it takes for a CSR to improve his or her performance may correlate to the effectiveness of his or her supervisor's coaching. By allowing a supervisor to see how long it takes his or her CSRs to improve, the CSR call statistics application 122 may allow supervisors to track their own performance and change their behavior to improve their own individual coaching strategies.

A further automated action that the CSR call statistics application 122 may perform is monitoring the medians and standard deviations of the threshold curves for each performance metric across the plurality of call centers 102a, 102b, 102c to assess the overall performance of the plurality of CSRs 104a, 104b, 104c and the effectiveness of the plurality of CSRs' 104a, 104b, 104c supervisors' coaching. In an embodiment, the medians for each performance metric across the plurality of call centers 102a, 102b, 102c will increase, and the standard deviations will become smaller. This may indicate that the performance of the plurality of CSRs 104a, 104b, 104c across the plurality of call centers 102a, 102b, 102c is increasing and that the supervisors' coaching techniques using the CSR call statistics application 122 are effective.

Another automated action that the CSR call statistics application 122 may perform is reconfiguring the switches 106a, 106b, 106c across the plurality of call centers 102a, 102b, 102c to not route calls of a first call reason to a CSR from the plurality of CSRs 104a, 104b, 104c who may have a below-average performance for the first call reason. Instead, the CSR call statistics application 122 may route calls of the first call reason to a CSR from the plurality of CSRs 104a, 104b, 104c who may have an average or above-average performance for the first call reason.

Figure 2:
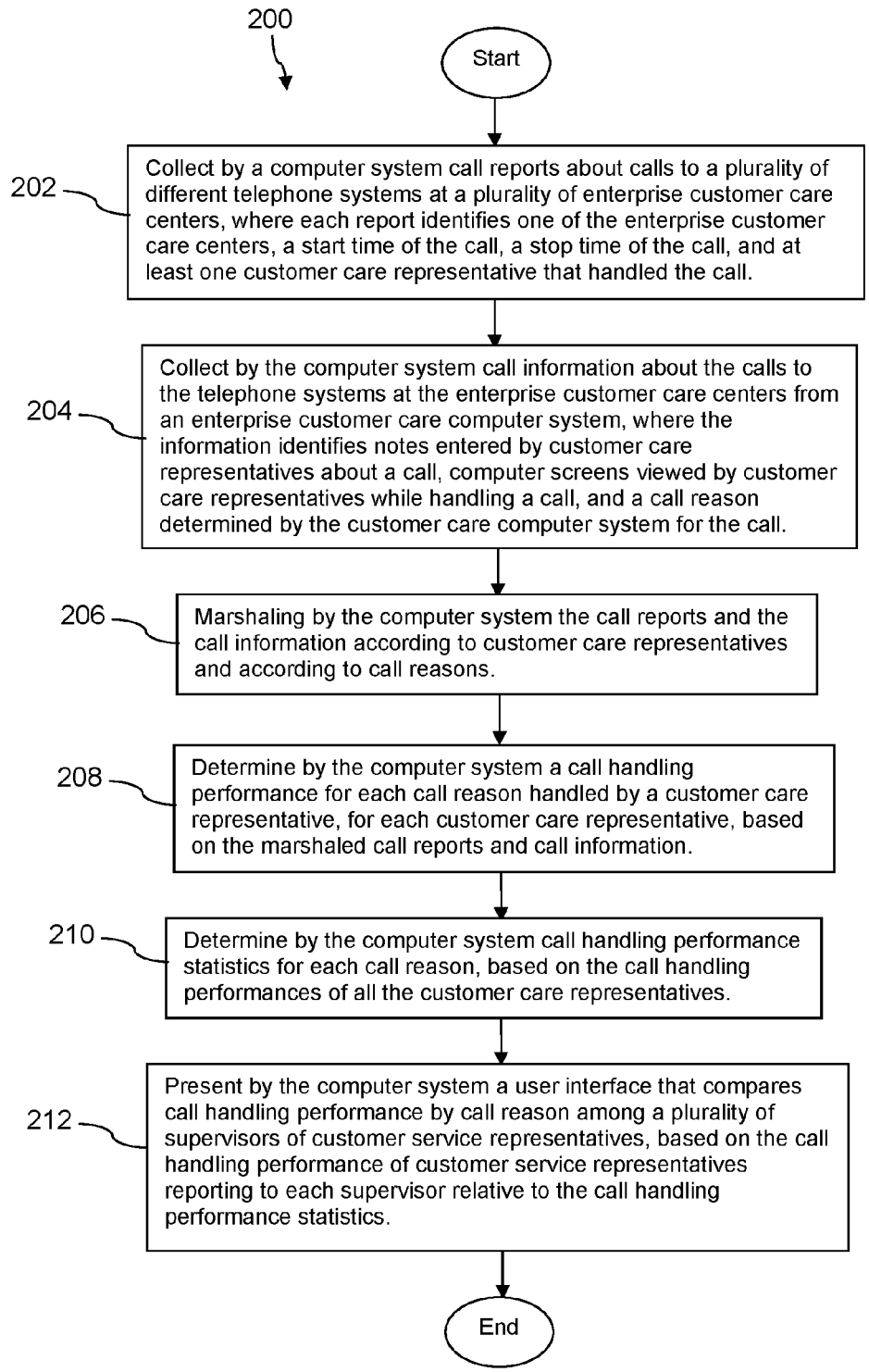
FIG. 2 is a flow chart of a method according to an embodiment of the disclosure.

Turning now to FIG. 2, a method 200 is described. At block 202, a computer system collects call reports about calls to a plurality of different telephone systems at a plurality of enterprise customer care centers, where each report identifies one of the enterprise customer care centers, a start time of the call, a stop time of the call, and at least one customer care representative that handled the call. For example, CSR call statistics application 122 collects data from the databases 108a, 108b, 108c across the plurality of call centers 102a, 102b, 102c regarding, as non-limiting examples, one of a plurality of call centers 102a, 102b, 102c, a call start time, a call end time, and a specific CSR who handled the call.

At block 204, the computer system collects call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call. For example, CSR call statistics application 122 collects data regarding, as a non-limiting example, a call reason from database 116.

At block 206, the computer system marshals the call reports and the call information according to customer care representatives and according to call reasons. For example, CSR call statistics application 122 compiles the data from the databases 108a, 108b, 108c, 116 in a database 124.

At block 208, the computer system determines a call handling performance for each call reason handled by a customer care representative, for each customer care representative, based on the marshaled call reports and call information.

At block 210, the computer system determines call handling performance statistics for each call reason, based on the call handling performances of all the customer care representatives.

At block 212, the computer system presents a user interface that compares call handling performance by call reason among a plurality of supervisors of customer service representatives, based on the call handling performance of customer service representatives reporting to each supervisor relative to the call handling performance statistics. For example, CSR call statistics application 122 presents the data in a user interface 126.

Figure 3:
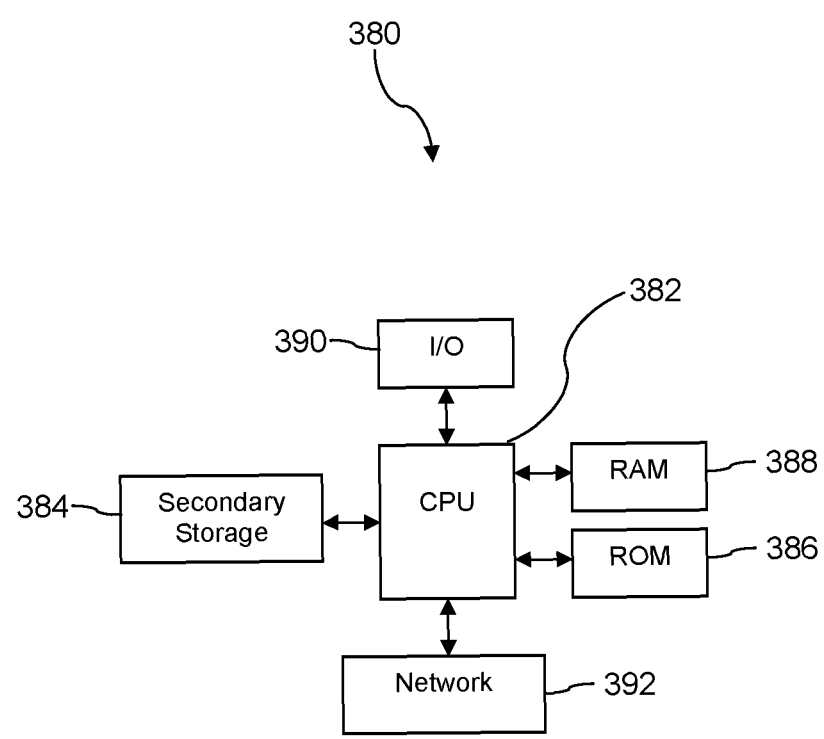
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system for evaluating and coaching call center employee performance, comprising:
   at least one processor;
   a non-transitory memory; and
   an application stored in the non-transitory memory that, when executed by the processor
      collects call reports about calls to a plurality of different telephone systems at a plurality of enterprise customer care centers, where each report identifies one of the enterprise customer care centers, a start time of the call, a stop time of the call, and at least one customer care representative that handled the call,
      collects call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call,
      marshals the call reports and the call information according to customer care representatives and according to call reasons,
      determines a call handling performance for each call reason handled by a customer care representative, for each customer care representative, based on the marshaled call reports and call information,
      determines call handling performance statistics for each call reason, based on the call handling performances of all the customer care representatives, and
      provides a user interface to compare call handling performance by call reason among a plurality of supervisors of customer service representatives, based on the call handling performance of customer service representatives reporting to each supervisor relative to the call handling performance statistics.

2. The computer system of claim 1, wherein the call handling performance for each call reason handled by a customer care representative comprises an average handling time for the call reason by the customer care representative, a call transfer rate for the call reason by the customer care representative, and a next call prevention metric for the call reason for the customer care representative.

3. The computer system of claim 2, wherein the call handling statistics for each call type comprise an average handling time median, an average handling time standard deviation, a call transfer rate median, a call transfer rate standard deviation, a next call prevention median, and a next call prevention standard deviation.

4. The computer system of claim 1, wherein the application collects call reports and call information on a periodic interval.

5. The computer system of claim 4, wherein the application collects call reports and call information once per week.

6. The computer system of claim 5, wherein the user interface provides a control input to select presenting a customer care representative's performance for each call reason for a plurality of weeks in one display screen.

7. The computer system of claim 1, wherein the user interface provides control inputs for selecting a customer care call handled by a first customer care representative and for selecting to present notes associated with the customer care call.

8. The computer system of claim 7, wherein the user interface provides control inputs for selecting to present notes associated with a next call associated with the customer care call.

9. A method of evaluating call center employee performance, comprising:
   collecting by a computer system call reports about calls to a plurality of different telephone systems at a plurality of enterprise customer care centers, where each report identifies one of the enterprise customer care centers, a start time of the call, a stop time of the call, and at least one customer care representative that handled the call,
   collecting by the computer system call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call,
   marshaling by the computer system the call reports and the call information according to customer care representatives and according to call reasons,
   determining by the computer system a call handling performance for each call reason handled by a customer care representative, for each customer care representative, based on the marshaled call reports and call information, determining by the computer system call handling performance statistics for each call reason, based on the call handling performances of all the customer care representatives, and presenting by the computer system a user interface that compares call handling performance by call reason among a plurality of supervisors of customer service representatives, based on the call handling performance of customer service representatives reporting to each supervisor relative to the call handling performance statistics.

10. The method of claim 9, further comprising:

receiving by the computer system an input selecting a call center;

receiving by the computer system an input selecting a supervisor associated with the input call center;

receiving by the computer system an input selecting a customer care representative associated with the supervisor;

presenting by the computer system a second user interface that represents call handling performance of the selected customer care representative according to call reasons; and coaching the customer care representative by the supervisor based on the presented call handling performance representation.

11. The method of claim 10, further comprising:

receiving by the computer system an input selecting details for a selected call reason for the selected customer care representative;

presenting by the computer system information about individual customer care calls handled by the selected customer care representative of the selected call reason;

receiving by the computer system an input selecting to present notes associated with one of the individual customer care calls; and presenting by the computer system notes associated with one of the individual customer care calls, where the notes identify actions taken by the customer care representative while handling the customer care call.

12. The method of claim 10, further comprising:

receiving by the computer system an input selecting a trended view of the selected customer care representative performance for the selected call reason; and presenting by the computer system a third user interface that represents call handling performance of the selected customer care representative for the selected call reason over four different analysis time periods.

13. The method of claim 12, wherein collecting of call reports and the collecting of call information is performed once per week and the four different analysis time periods are four subsequent weeks.

14. The method of claim 9, wherein the call handling performance for each call reason handled by a customer care representative comprises an average handling time for the call reason by the customer care representative, a call transfer rate for the call reason by the customer care representative, and a next call prevention metric for the call reason for the customer care representative.

15. A computer system for evaluating and coaching call center employee performance, comprising:

at least one processor;

a non-transitory memory; and an application stored in the non-transitory memory that, when executed by the processor collects call reports about calls to a plurality of different telephone systems at a plurality of enterprise customer care centers, where each report identifies one of the enterprise customer care centers, a start time of the call, a stop time of the call, and at least one customer care representative that handled the call, collects call information about the calls to the telephone systems at the enterprise customer care centers from an enterprise customer care computer system, where the information identifies notes entered by customer care representatives about a call, computer screens viewed by customer care representatives while handling a call, and a call reason determined by the customer care computer system for the call, marshals the call reports and the call information according to customer care representatives and according to call reasons, determines a call handling performance for each call reason handled by a customer care representative, for each customer care representative, based on the marshaled call reports and call information, determines call handling performance statistics for each call reason, based on the call handling performances of all the customer care representatives, identifies when the performance of a first customer care representative in handling a first call type is falling below a predefined threshold of performance, where the predefined threshold is defined in terms of a number of standard deviations from a median performance value for the first call type, and takes action based on the identified performance falling below the threshold.

16. The system of claim 15, where the action taken is to reconfigure an automated customer care call distribution system to not route calls of the first call type to the first customer care representative.

17. The system of claim 15, where the action taken is to send an electronic notification of the performance of the first customer care representative handling the first call type falling below the threshold to the first customer care representative.

18. The system of claim 15, where the action taken is to send an electronic notification of the performance of the first customer care representative handling the first call type falling below the threshold to a supervisor of the first customer care representative.

19. The system of claim 15, where the action taken is to send an electronic notification of the performance of the first customer care representative handling the first call type falling below the threshold to a manager of the supervisor of the first customer care representative.

20. The system of claim 15, where the action taken is to monitor changes in the median performance value and the standard deviations from the median performance value and evaluate a performance of a plurality of supervisors of a plurality of customer care representatives in remediating performances below the threshold of the plurality of customer care representatives.

\* \* \* \* \*